(12) United States Patent
Miyazawa et al.

(10) Patent No.: US 12,356,246 B2
(45) Date of Patent: Jul. 8, 2025

(54) NETWORK MANAGEMENT FOR OFFLOADING

(71) Applicant: RAKUTEN MOBILE, INC., Tokyo (JP)

(72) Inventors: Takuya Miyazawa, Tokyo (JP); Jin Kusumi, Tokyo (JP); Kenichiro Aoyagi, Tokyo (JP); Jin Nakazato, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/797,806

(22) PCT Filed: May 31, 2022

(86) PCT No.: PCT/JP2022/022059
§ 371 (c)(1),
(2) Date: Aug. 5, 2022

(87) PCT Pub. No.: WO2023/233505
PCT Pub. Date: Dec. 7, 2023

(65) Prior Publication Data
US 2024/0205745 A1 Jun. 20, 2024

(51) Int. Cl.
*H04W 28/08* (2023.01)
*G06F 9/50* (2006.01)
(52) U.S. Cl.
CPC ............ *H04W 28/08* (2013.01); *G06F 9/505* (2013.01); *G06F 2209/509* (2013.01)

(58) Field of Classification Search
CPC ....... H04W 28/08; H04W 92/20; G06F 9/505; G06F 2209/509
See application file for complete search history.

(56) References Cited

U.S. PATENT DOCUMENTS

| | | | |
|---|---|---|---|
| 2003/0101265 A1* | 5/2003 | Dantzig | H04L 67/1012 709/226 |
| 2007/0055702 A1* | 3/2007 | Fridella | G06F 16/122 |
| 2017/0353397 A1* | 12/2017 | Che | G06F 9/5088 |
| 2021/0352564 A1 | 11/2021 | Han | |
| 2022/0038378 A1* | 2/2022 | Zhang | H04L 47/125 |

(Continued)

FOREIGN PATENT DOCUMENTS

| | | | |
|---|---|---|---|
| JP | 2019-028673 A | 2/2019 | |
| JP | 2019-062510 A | 4/2019 | |

(Continued)

*Primary Examiner* — Rasheed Gidado
(74) *Attorney, Agent, or Firm* — Sughrue Mion, PLLC (57) ABSTRACT

A management apparatus executes a determination process and an offloading control process. The determination process is a process for determining whether a processing load in an execution server, among a plurality of edge servers, executing a processing requested by a plurality of communication apparatus meets a distribution start condition. The offloading control process is a process for, in a case where it is determined that the processing load meets the distribution start condition, controlling to offload a processing being executed by the execution server to one or more offload destination servers, among the plurality of edge servers, that is different from the execution server to meet a processing request time for the requested processing.

13 Claims, 10 Drawing Sheets

(56) References Cited

U.S. PATENT DOCUMENTS

2022/0083391 A1* 3/2022 Liu ..................... G06F 9/5072
2022/0255878 A1 8/2022 Ono et al.

FOREIGN PATENT DOCUMENTS

| | | |
|---|---|---|
| JP | 2019-87847 A | 6/2019 |
| JP | 2022-504243 A | 1/2022 |
| WO | 2021/014556 A1 | 1/2021 |

* cited by examiner

NETWORK MANAGEMENT FOR OFFLOADING

CROSS REFERENCE TO RELATED APPLICATIONS

This application is a National Stage of International Application No. PCT/JP2022/022059 filed May 31, 2022.

TECHNICAL FIELD

This disclosure relates to a network management for offloading among a plurality of edge servers.

BACKGROUND ART

Multi-access edge computing (MEC) is an edge computing technology that deploys servers (MEC servers) that provide services in a distributed manner in a communication network (Patent Literature 1). MEC provides communication services to a user terminal by deploying MEC servers at locations close to the user terminal (i.e., at an edge in a network). Compared to cloud computing, MEC can provide services to user terminals with lower latency and reduce traffic flowing to an upper network. In other words, cloud computing provides communication services to user terminals via computer networks such as the Internet, but by deploying MEC servers, network latency reduction and load distribution (load balancing) are expected.

LISTING OF REFERENCES

Patent Literature

PATENT LITERATURE 1: Laid-open Publication of Japanese patent Application No. 2019-87847 A

SUMMARY OF THE INVENTION

Problems to be Solved by the Invention

In a case where a plurality of MEC servers are deployed in a communication network, more efficient load distribution is expected. On the other hand, there may be cases where load is concentrated on some MEC servers, and to deal with such cases, offloading control may be used. Offloading control is a mechanism to reduce system load by having other devices execute processing that one device executes instead. In a system in which a plurality of MEC servers are deployed, for example, in a case where load concentrates on one MEC server, it is possible to offload the load to the other MEC servers.

However, in a case where offloading control is not properly performed, resulting latency may not be reduced. For example, in a case where, as a result of offloading, a required latency for processing requested by a user terminal no longer met, usability for the user terminal would be degraded.

The present invention has been made in order to the above mentioned problems and an object thereof is to provide a technique for offloading control properly for edge servers while reducing an impact on users.

Solution to Problem

In order to solve the above mentioned problems, according to one aspect of the present invention, there is provided a management apparatus which comprises: at least one processor; wherein the at least one processor being configured execute a determination process and an offloading control process. The determination process is a process for determining whether a processing load in an execution server, among a plurality of edge servers, executing a processing requested by a plurality of communication apparatus meets a distribution start condition. The offloading control process is a process for, in a case where it is determined that the processing load meets the distribution start condition, controlling to offload a processing being executed by the execution server to one or more offload destination servers, among the plurality of edge servers, that is different from the execution server to meet a processing request time for the requested processing.

In order to solve the above mentioned problems, according to another aspect of the present invention, there is provided an edge server which comprises: at least one processor; wherein the at least one processor being configured execute an execution process, a determination process and a request process. The execution process is a process for executing processing requested by a plurality of communication apparatus. The determination process is a process for determining whether a processing load in the execution process meets a distribution start condition. The request process is a process for, in a case where it is determined that the processing load meets the distribution start condition, requesting to a management apparatus to offload a portion of the requested processing to one or more other edge servers to meet a proceeding request time for the requested processing.

In order to solve the above mentioned problems, according to one aspect of the present invention, there is provided a control method of a management apparatus which comprises: determining whether a processing load in an execution server, among a plurality of edge servers, executing a processing requested by a plurality of communication apparatus meets a distribution start condition; and controlling, in a case where it is determined that the processing load meets the distribution start condition, to offload a processing being executed by the execution server to one or more offload destination servers, among the plurality of edge servers, that is different from the execution server to meet a processing request time for the requested processing.

Advantageous Effect of the Invention

According to the present invention, it makes it possible to provide a technique for advertising routing information to improve the efficiency of network operations. appropriate offloading control for multiple edge servers while reducing the impact on users.

DESCRIPTION OF EMBODIMENTS

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

In the present embodiment, a network to which the technology according to the present disclosure is assumed to be Fifth generation (5G) mobile network (5G network) standardized in Third Generation Partnership Project (3GPP). Alternatively, the technology according to the present disclosure may be applied to networks other than 5G network.

<Network Configuration>

Figure 1:
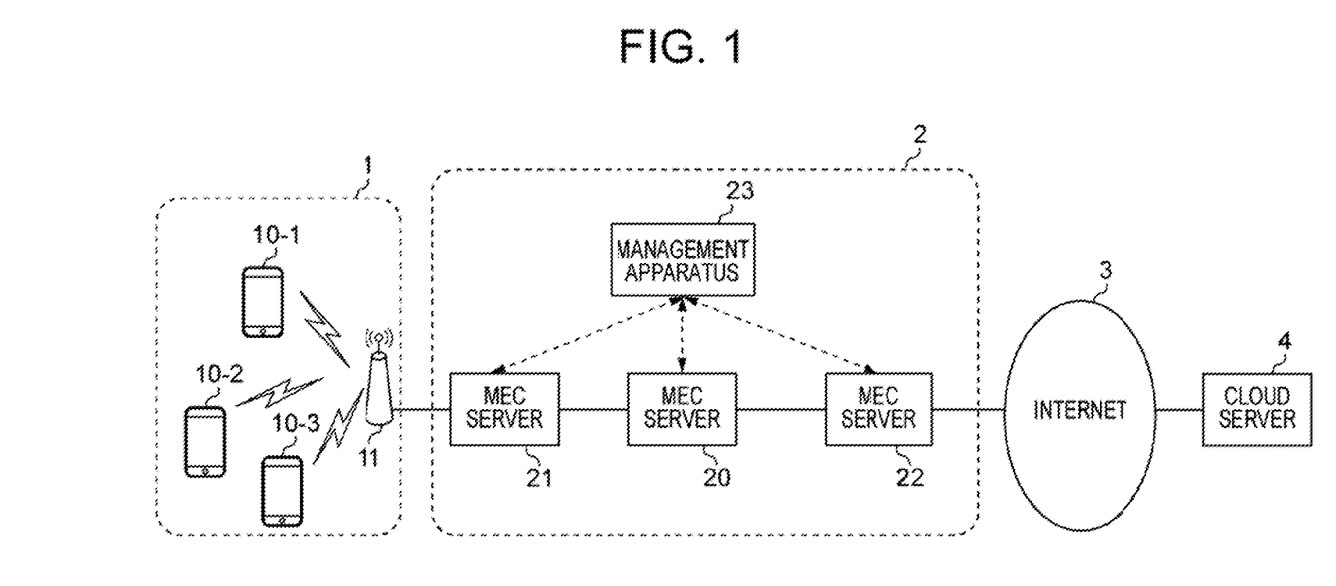
FIG. 1 illustrates an example network configuration according to an embodiment of the present disclosure.

FIG. 1 illustrates an example network configuration according to an embodiment of the present disclosure. A base station 11 includes at least a device that executes Radio Unit (RU), which is a part of Radio Access Network (RAN) functions, and is wirelessly connected to, via a radio access network, a plurality of user terminals (communication apparatuses, hereinafter referred to as UEs) 10-1 to 10-3 in a cell 1, which is an area of responsibility of the base station 11. The UEs 10-1 to 10-3 are configured to receive communication services provided by a cloud server 4 connected to Internet 3 via the base station 11 and a core network 2. MEC servers 20 to 22 in the core network 2 are server devices (edge servers) for edge computing (MEC in the present embodiment). The base station 11 may be configured to implement MEC server functions. As described below, a User Plane Function (UPF) is connected to the MEC server, as described below. In the following description, the UEs that are connected to the base station 11 in the cell 1 may be referred to collectively as a UE 10.

In FIG. 1, the MEC server 21 is located on a route between the MEC server 20 and the UEs 10-1 to 10-3, and the MEC server 22 is located on a route between the MEC server 20 and the cloud server 4 connected via Internet 3. In other words, the MEC server 21 can be referred as a near node located closer to the UEs 10-1 to 10-3 than the MEC server 20, while the MEC server 22 can be referred as a far node located farther away from the UEs 10-1 to 10-3 than the MEC server 20. In the present embodiment, the MEC server 20 is a server device that executes processing requested by the UEs 10-1 to 10-3 (an execution server). The MEC server 20 executes processing in response to a request from the UE 10-1 to 10-3 and transmits data (i.e., execution results) as a response to the request.

Each of the UEs 10-1 to 10-3 may request the MEC server 20 to execute multiple processing, and, for each processing, notify the MEC server 20 of a required latency (processing request time), which indicates a time from the request to the response. Each processing may be processing for a specific application or a transactional processing. The MEC server 20 executes each processing and returns the response to the UEs 10-1 to 10-3 to meet the required latency. On the other hand, in a case where an amount of processing executed by the MEC server 20 increases and it becomes difficult to meet the required latency, the MEC server 20 or the management apparatus 23 may perform control for load distribution (offloading) control (offloading control) to meet the required latency. The offloading control is described below.

The management apparatus 23 communicates with the MEC servers 20 to 22 and performs offloading control. In a case where the base station 11 implements a MEC server function, the management apparatus 23 may be configured to communicate with the base station 11.

In FIG. 1, there are three UEs connected wirelessly to the base station 11 (the UEs 10-1 to 10-3), but any number of UEs may be connected. In addition, the core network 2 includes three MEC servers (the MEC servers 20 to 22), but it may include any number of MEC servers. Note that the example network configuration in FIG. 1 illustrates a functional configuration and not necessarily a physical configuration.

Figure 10:
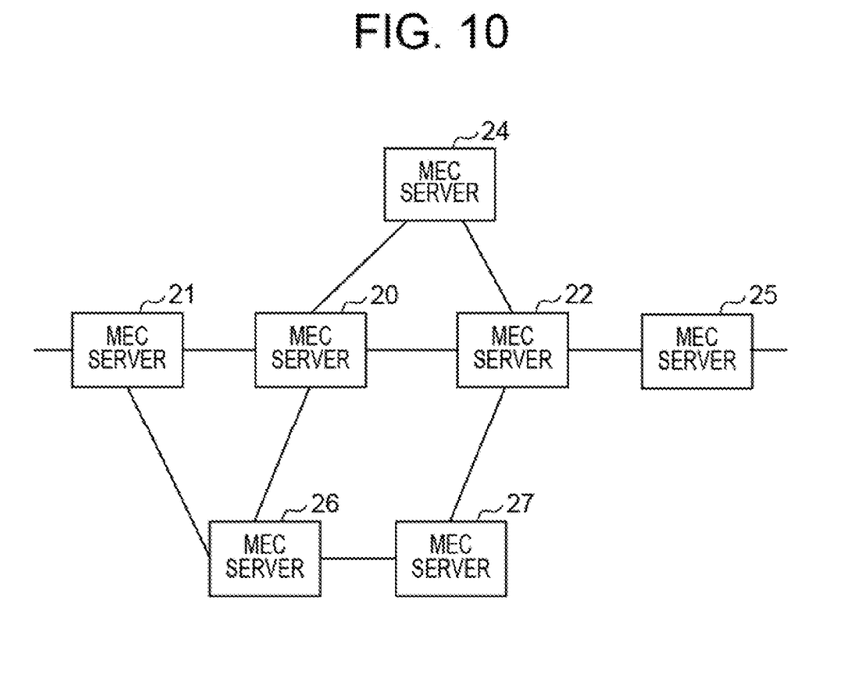
FIG. 10 illustrates an example of MEC server arrangement.

The arrangement of the MEC servers in the core network 2 is not limited to the arrangement shown in FIG. 1. The MEC may be connected using any network topology. FIG. 10 illustrates an example of MEC server arrangement. In FIG. 10, an example is shown in which, in addition to the MEC servers 20 to 22 shown in FIG. 1, MEC servers 24 to 27 are deployed which have a similar configuration to the MEC servers 20 to 22. In this example, the MEC servers 21 and 26 are located closer to the UEs 10-1 to 10-3 than the MEC server 20 (near nodes), and the MEC servers 22 and 25 are farther away from the UEs 10-1 to 10-3 than the MEC server 20 (far nodes).

<Hardware Configuration of Management Apparatus and MEC Server>

Figure 2:
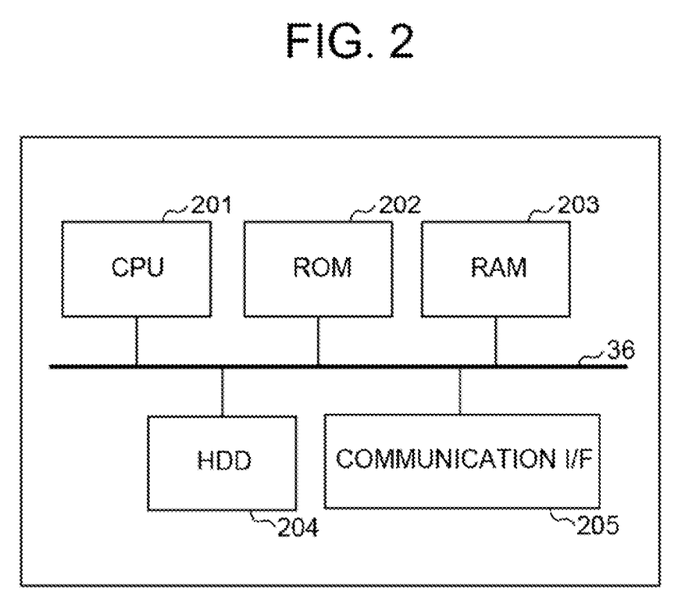
FIG. 2 illustrates an example hardware configuration of a management apparatus according to an embodiment of the present disclosure.

FIG. 2 illustrates an example of a hardware configuration of the management apparatus 23 according to the present embodiment. The MEC servers 20 to 22 and the UE 10 may have a similar hardware configuration.

As shown in FIG. 2, the management apparatus 23 consists of a Central Processing (CPU) 201 and a Read Only Memory (ROM) 202, a Random Access Memory (RAM) 203, a Hard Disc Drive (HDD) 204, a communication interface (I/F) 205 and a system bus 206. The management apparatus 23 may also be equipped with an external memory.

The CPU 201 is composed of one or more processors and comprehensively controls operations in the management apparatus 23. The CPU 201 controls the components (i.e., the components 202 to 205) via the system bus 206 which is a data transmission path. The CPU 206 may be replaced by one or more processors such as an Application Specific Integrated Circuit (ASIC), a Field Programmable Gate Array (FPGA), a Digital Signal Processor (DSP), and Graphics Processing Unit (GPU).

The ROM 202 is a nonvolatile memory that stores a control program or the like which is necessary for the CPU 201 executing processing. The program may be stored in a non-volatile memory such as the HDD 204, a Solid-State Drive (SSD), or in an external memory such as a removable storage medium (not shown).

The RAM 203 is a volatile memory and functions as the main memory, work area, etc., for the CPU 201. In other words, the CPU 201, when executing processing, loads the necessary programs, etc., stored in the ROM 202 onto the RAM 203 and executes the program to realize various functional operations.

The HDD 204 stores, for example, various data, various information, etc., necessary for the CPU 201 executing processing. Also, the HDD 204 stores, for example, various data, various information, etc., obtained through processing by the CPU 201. The storage may be performed together with the HDD 204, or instead of the HDD 204 using external memory such as the SSD or other non-volatile memory or removable storage media.

The communication I/F 205 is an interface that controls communication between the management apparatus 23 and external devices.

Note that the management apparatus 23, the MEC servers 20 to 22 and the UE 10 may be equipped with a dedicated hardware to perform their respective functions, or they may perform some of their functions by a hardware and others by a computer running a program. Alternatively, all functions may be performed by a computer and a program.

<Functional Configuration of Management Apparatus>

Figure 3:
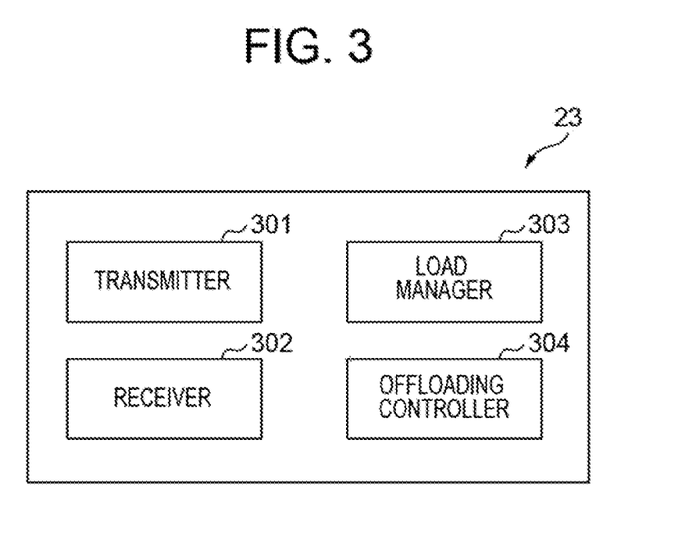
FIG. 3 illustrates an example of the functional configuration of a management apparatus according to an embodiment of the present disclosure.

FIG. 3 illustrates an example of a functional configuration of the management apparatus 23 according to the present embodiment. Each of the functions of the management apparatus 23 is, for example, a logical function realized by the hardware of the management apparatus 23, and may be realized by the CPU 201 executing a program stored in the ROM 202, etc. In the present embodiment, the management apparatus 23 has the following functional configurations: a transmitter 301, a receiver 302, a load manager 303, and an offloading controller 304.

The transmitter 301 and the receiver 302 respectively transmits and receives a packet via the communication I/F 205 to transmit and receive a packet. The load manager 303 manages a processing load on the MEC server 20 (an execution server) executing processing requested by the UE 10. For example, the load manager 303 manages an amount of processing (an amount of processing per unit time, i.e., throughput) of the processing being executed by the MEC server 20 and a usage rate of computing resources used to execute the processing (computing resources such as the CPU 201 and a memory (the RAM 203, etc.)). The load manager 303 determines whether the processing load meets a predetermined distribution start condition. For example, the load manager 303 determines that the processing load meets the predetermined distribution start condition in a case where the amount of processing exceeds a predetermined threshold value. In a case where the load manager 303 determines that the distribution start condition is met, the offloading controller 304 performs offloading control to offload the processing being executed by the MEC server 20. The offloading control is described below.

<Functional Configuration of MEC Server>

Figure 4:
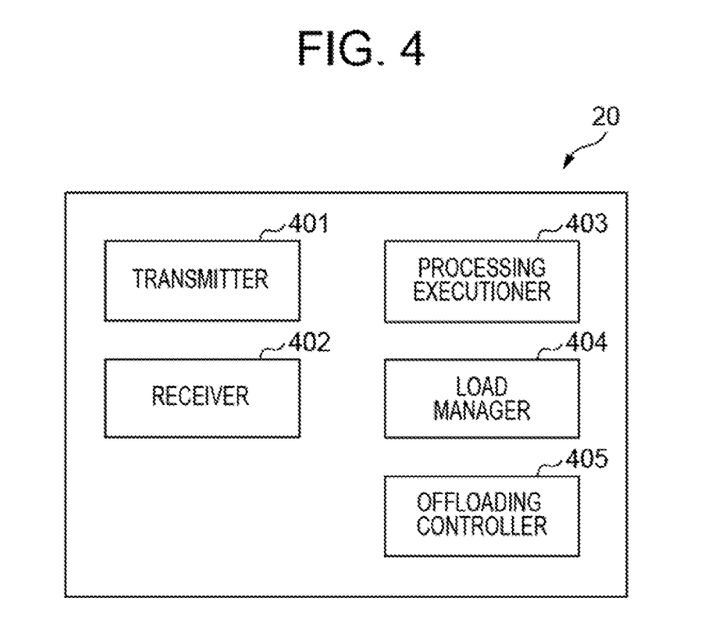
FIG. 4 illustrates an example of the functional configuration of an MEC server according to an embodiment of the present disclosure.

FIG. 4 illustrates an example of a functional configuration of the MEC server 20 according to the present embodiment. The MEC servers 21 and 22 may have a similar hardware configuration. Each of the functions of the MEC server 20 is, for example, a logical function realized by the hardware of the MEC server 20, and may be realized by the CPU 201 executing a program stored in the ROM 202, etc. In the present embodiment, the MEC server 20 has the following functional configurations: a transmitter 401, a receiver 402, a processing executioner 403, a load manager 404, and an offloading controller 405.

The transmitter 401 and receiver 402 respectively transmits and receives a packet via the communication I/F 205 to transmit and receive a packet. The processing executioner 403 executes processing, including processing requested by the UE 10. For example, the processing executioner 403 comprises one or more applications to execute the processing requested by the UE 10 and executes the processing by launching the applications. The load manager 404 manages an amount of processing (an amount of processing per unit time, i.e., throughput) of the processing being executed by the processing executioner 403 and a usage rate of computing resources used to execute the processing (computing resources such as the CPU 201 and a memory (the RAM 203, etc.)). The load manager 404 determines whether the processing load meets a predetermined distribution start condition. For example, the load manager 404 determines that the processing load meets the predetermined distribution start condition in a case where the processing load exceeds a predetermined threshold. In a case where the load manager 404 determines that the distribution start condition is met, the offloading controller 405 performs offloading control to offload the processing being executed by the processing executioner 403. The offloading control is described below.

<Process Flow (Case where the Start and End of Load Distribution is Determined by the Management Apparatus 23)>

Figure 5:
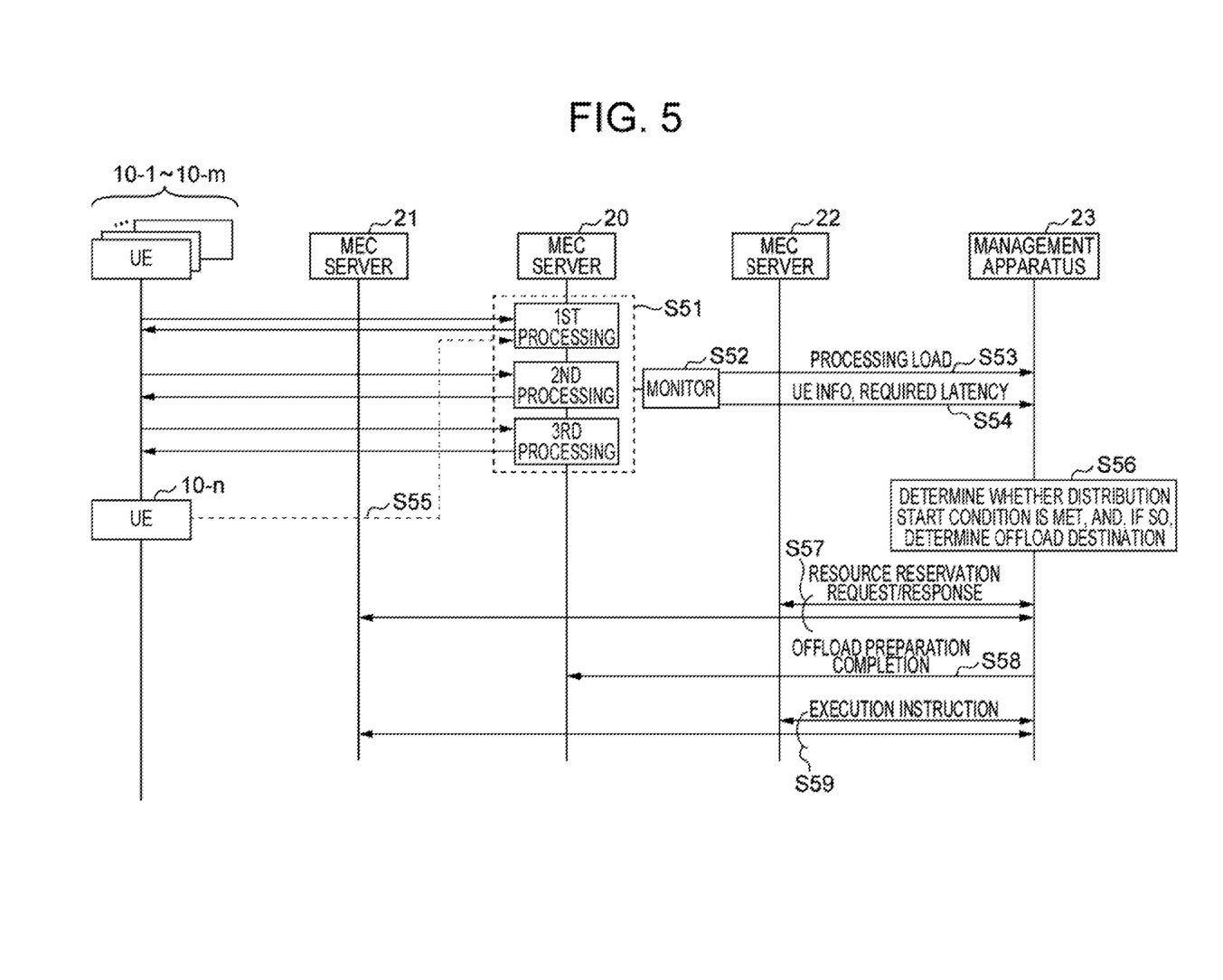
FIG. 5 illustrates a communication sequence diagram before offloading, in a case where a start and end of load distribution is determined by a management apparatus.
Figure 6:
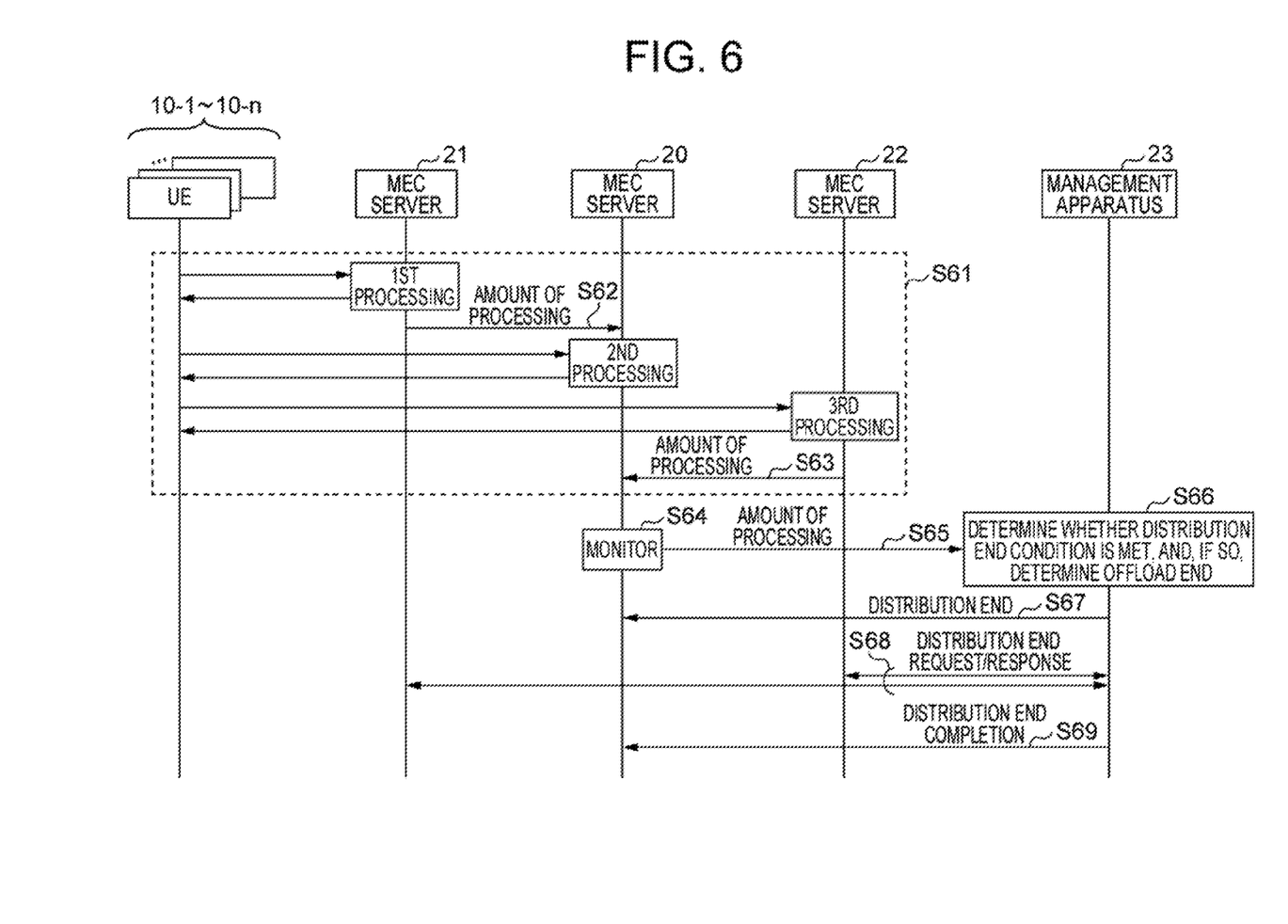
FIG. 6 illustrates a communication sequence diagram after offloading, in a case where a start and end of load distribution is determined by a management apparatus.

Referring to FIGS. 5 and 6, a process flow in a case where the start and end of load distribution is determined by the management apparatus 23 is described. FIG. 5 illustrates a communication sequence before offloading, and FIG. 6 illustrates a communication sequence after offloading.

As shown in FIG. 5, in S51, the processing executioner 403 of the MEC server 20 is executing the processing requested by the UEs 10-1 to 10-m including the UEs 10-1 to 10-3 in the cell 1 (m is an arbitrary integer). In the example in FIG. 5, the UEs 10-1 to 10-m requests the MEC server 20 to execute three types of processing, respectively, referred to as the first, second, and third processing. Each of the first to third processing is an independent processing and may be processing for a specific application or a transactional processing. The processing executioner 403 is responsible for executing each processing to meet a required latency for each processing notified by the UEs 10-1 to 10-m. In the example in FIG. 5, although the number of processes requested to the MEC server 20 is three, the number of processes is not limited to a specific number.

The load manager 404 of the MEC server 20 monitors the processing load in the MEC server 20 (the processing load in the processing executioner 403) due to execution of the first to third processing (S52), and the transmitter 401 transmits a packet containing information on the processing load to the management apparatus 23 to report the processing load (S53). The transmitter 401 may periodically report the processing load to the management apparatus 23. The processing load may be an amount of processing being executed by the processing executioner 403 of the MEC server 20 (in the example in FIG. 5, at least a total amount of processing from the first to the third processing) or a usage rate of computing resources used to execute the processing (computing resources such as the CPU 201 and a memory (the RAM 203, etc.)).

In addition, the load manager 404 of the MEC server 20 transmits, via the transmitter 401, a packet containing an identification information of the UEs 10-1 to 10-*m* requesting processing to the MEC server 20 and information of a required latency for the first to third processing to the management apparatus 23 (S54).

The receiver 302 of the management apparatus 23 receives the processing load transmitted in S53, and the load manager 303 determines whether the processing load meets the distribution start condition to start offloading control (S56).

In a case where a UE 10-*n* communicating in the cell 1 which is different from the UEs 10-1 to 10-*m* (n is an arbitrary integer greater than m) requests the MEC server 20 to execute the first processing (S55), the load manager 404 of the MEC server 20 also reports the processing load in the processing executioner 403 to the management apparatus 23 via the transmitter 401 (S53). In the example in FIG. 5, the load manager 303 of the management apparatus 23 determines that the reported processing load meets the distribution start condition. (S56). For example, when the processing load is an amount of processing being executed by the processing executioner 403 of the MEC server 20, the load manager 303 determines that the processing load meets the distribution start condition in a case where the amount of processing exceeds a predetermined first threshold value. Alternatively, when the processing load is a resource usage rate (i.e., a usage rate of resources) for executing processing by the processing executioner 403 of the MEC server 20, in a case where the resource usage rate exceeds a predetermined second threshold value, the load manager 303 determines that the processing load meets the distribution start condition.

In a case where it is determined that the processing load meets the distribution start condition, the offloading controller 304 of the management apparatus 23 determines one or more MEC servers (offload destination servers) to which a portion of the processing is to be offloaded and a type of processing to be allocated to meet the required latency for each processing received in S54 is met (S56). In the example in FIG. 5, the offloading controller 304 determines the MEC servers 21 and the MEC server 22 as the offload destination servers. Then, the offloading controller 304 of the management apparatus 23 transmits a packet including a resource reservation request to the MEC server 21 and the MEC server 22 (S57). The resource reservation request contains an indication of the type of processing to be allocated (offloaded) (i.e., one of the first to three processing in the example in FIG. 5). MEC server 20 and MEC server 22 return a packet to the management apparatus 23 containing a response indicating that they are configured (ready) or not configured to execute the indicated type of processing. In a case where the MEC server 20 or MEC server 22 is not configured to execute the indicated type of processing, the offloading controller 304 of the management apparatus 23 transmits a packet containing a request to prepare to execute the processing via the transmitter 301. For example, the management apparatus 23 transmits a request to create or start (launch) an application to execute the processing.

The type of process to be allocated to the MEC server 20 and MEC server 22 by the management apparatus 23 may be predetermined or determined based on the feature of the first to third processing. For example, in a case where the first processing corresponds to processing with the shortest required latency, the first process may be allocated to the MEC server 21 which is located closer to the UE 10 than the MEC server i.e., located on the route between the MEC server 20 and the UE 10.

In a case where the response indicating ready is received by the management apparatus 23 from the MEC server 20 and the MEC server 22, preparation for offloading by the management apparatus 23 is complete. The offloading controller 304 of the management apparatus 23 transmits a packet containing information of offload preparation completion to the MEC server 20 via the transmitter 301 (S58). Note that processing for transmitting the offload preparation completion to the MEC server 20 may be omitted.

After the preparation for offloading is complete, the offloading controller 304 of the management apparatus 23 transmits a packet containing an execution instruction to the MEC server 20 via the transmitter 301 (S59). The execution instructions include identification information of one or more UEs requesting the processing. In a case where the first processing is offloaded to the MEC server 20 and the third processing is offloaded to the MEC server 22, the management apparatus 23 transmits, to the MEC server 21, the identification information containing the UEs 10-1 to 10-*m* requesting the first process, and transmits, to the MEC server 22, the identification information containing the UEs 10-1 to 10-*m* and 10-*n* requesting the third process.

In addition, for example, in a case where only the first processing requested by the UE 10-*n* that caused an overload at the MEC server 20 is offloaded, the management apparatus 23 may transmits, to the offload destination edge server that executes the first processing, the execution instruction containing the identification information of the UE 10-*n*. This allows the first to third processing requested by the previously connected UEs 10-1 to 10-*m* to be executed by the MEC server 20, while the first processing requested by the UE-n, which caused the overload at the MEC server, to be offloaded.

Referring to FIG. 6, the communication sequence after offloading is described. In the example in FIG. 6, of the first to third processing shown in FIG. 5, the first processing is offloaded to the MEC server 20, and the second processing is offloaded to the MEC server 22. Although the UE 10 is not notified of the offloading, the UE 10 can request an execution of the processing and receive the response to the request using the same procedure as before the offloading. In other words, the UE 10 request the MEC server 20 to execute the first to third processing, while the MEC server 20 executes only the second processing, the MEC server 21 executes the first processing, and the MEC server 22 executes the third processing. The UPF connected to the MEC server 21 is controlled so that the MEC server 20 does not receive the request to execute the first processing transmitted by the UE 10, but the MEC server 21 can receive the request to execute the first processing.

Figure 9:
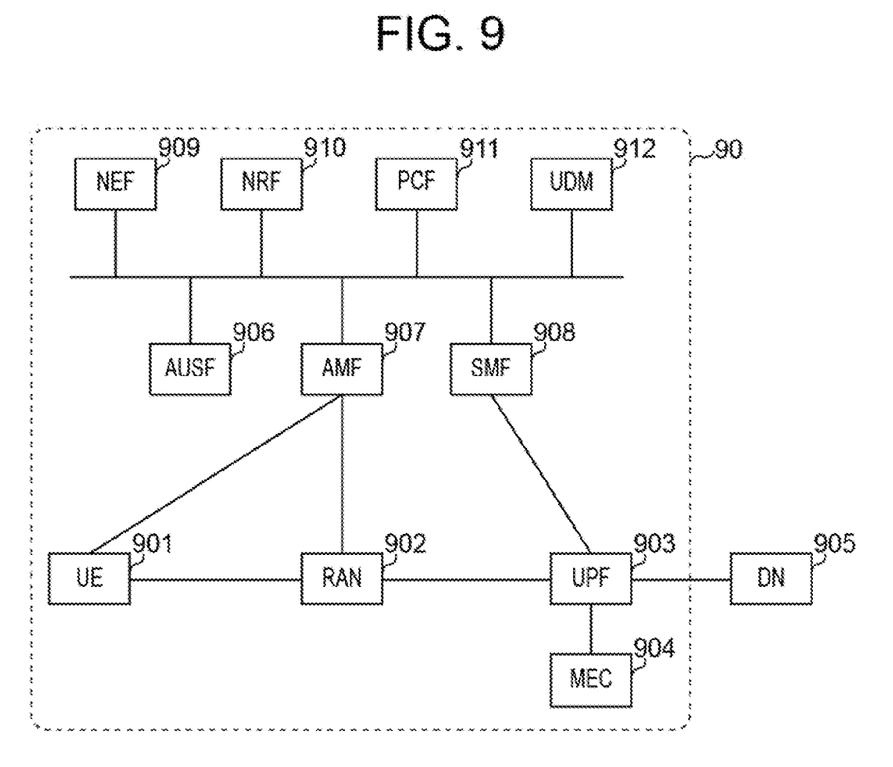
FIG. 9 illustrates a schematic example of 5G network.

The control of the UPF is described below. FIG. 9 illustrates a schematic example of 5G network. The 5G network 90 shown in FIG. 9 consists of a UE 901, a RAN 902, and an User Plane Function (UPF) 903, a MEC 904, and an Authentication Server Function (AUSF) 906, an Access and Mobility Management Function (AMF) 907, a Session Management Function (SMF) 908, a Network Exposure Function (NEF) 909, a Network Repository Function (NRF) 910, a Policy Control Function (PCF) 911, and an Unified Data Management (UDM) 912. The UPF 903 is equipped with a Data Network (DN) 905. The UE 901 and the MEC 904 correspond to the UE 10 and the MEC servers 20 to 22 in FIG. 1, respectively. The RAN 902 includes the base station 11 in FIG. 1. The offloading controller 304 of the manager 23 may controls the UPF 903 connected to the MEC server 21 so that the request for the first processing to the MEC server 20 reaches the MEC server 21 (intercept control). Alternatively, as shown in FIG. 9, since the UPF 903 is controlled by the SMF 908, offloading controller 304 of the manager 23 may controls the SMF 908 so that the request for the first processing to the MEC server 20 reaches the MEC server 21. Alternatively, the UPFs 903 connected to the MEC server 20 to 22 may control by communicating one other so that the request for the first processing to the MEC server 20 reaches the MEC server 21.

In addition, the request for the third processing transmitted by the UE 10 may be received by the MEC server 20, but the third processing may be not executed by the MEC server 20, and it may be executed by the MEC server 22 instead. Alternatively, the offloading controller 304 of the management apparatus 23 may control the UPFs 903 connected to the MEC servers 20 and 22 so that the request for the third processing transmitted by the UE 10 reaches not the MEC server 20 but the MEC server 22 (bypass control). This control is like the control described above for the UPF 903 connected to the MEC server 21.

In FIG. 6, the MEC server 21 is executing the first processing, the MEC server 20 is executing the second processing, and MEC server 22 is executing the third processing (S61). The load manager 404 of the MEC server 21 reports an amount of the first processing the processing volume of the first processing (an amount of processing per unit of time, or the number processes included in the first processing and the number of UEs requesting the first processing) to the MEC server 20 via the transmitter 401 (S62). Similarly, the load manager 404 of the MEC server 22 reports an amount of the third processing to the MEC server 20 via transmitter 401 (S63).

The load manager 404 of the MEC server 20 monitors a total amount of processing which includes an amount of the first processing and the second processing which is reported by the MEC server 21 and the MEC server 22, and an amount of the second processing that the MEC server 20 itself is executing (S64). The load manager 404 of the MEC server 20 reports the total amount of processing to the management apparatus 23 (S65).

The offloading controller 304 of the management apparatus 23, via the receiver 302, receives the total amount of processing and determines whether the total amount of processing meets a distribution end (i.e., termination) condition (S66). For example, the offloading controller 304 of the management apparatus 23 determines that the distribution end condition is met in a case where the total amount of processing exceeds a predetermined third threshold value. Upon determining that the distribution end condition is met, the offloading controller 304 of the management apparatus 23 transmits a packet indicating offloading end (distribution end (termination)) to the MEC server 20 via the transmitter 301. In this way, the management apparatus 23 notifies the MEC server 20 that offloading is to be terminated. The offloading controller 304 of the management apparatus 23 then transmits a packet, to the MEC server 21 and MEC server 22, containing an offloading end request (a distribution end request) via the transmitter 301 (S68). The MEC server 21 and MEC server 22, after receiving the offload end request, transmits a packet containing a response to the management apparatus 23 (S68).

The offloading controller 304 of the management apparatus 23 receives the response from the MEC server 21 and the MEC server 22 via the receiver 302 and transmits a packet indicating a distribution end completion to the MEC server 20 via the transmitter 301. Note that before transmitting the distribution end completion, the management apparatus 23 may control the UPFs 903 connected to the MEC server 21 and the MEC server 22 so that the MEC server 20 directly receive a request of an execution of the first processing and an execution of the third processing. The first processing and the third processing would then be executed by the MEC server 20.

<Process Flow (Case where the Start and End of Load Distribution is Determined by the MEC Server 20)

Figure 7:
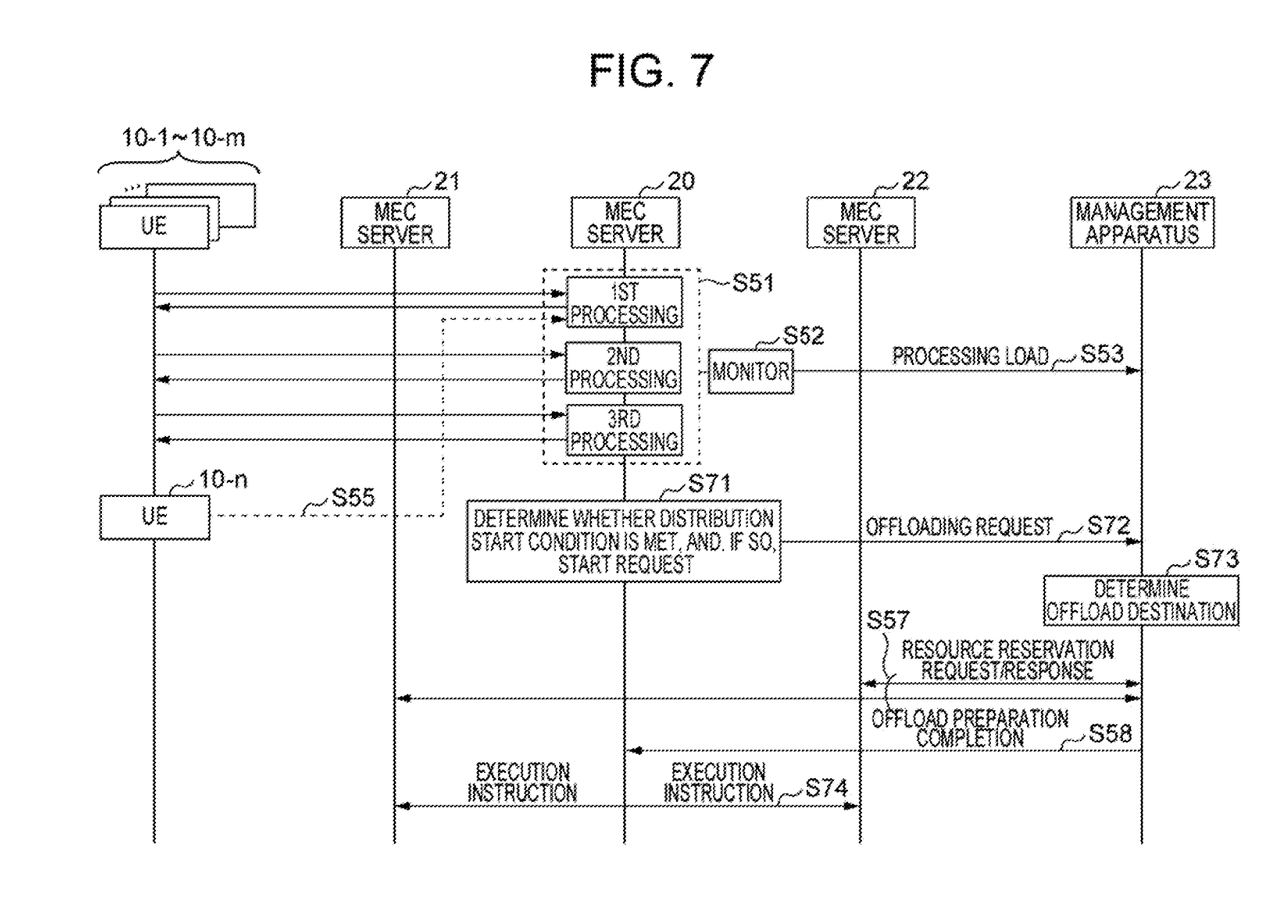
FIG. 7 illustrates a communication sequence diagram before offloading, in a case where a start and end of load distribution is determined by a MEC server.
Figure 8:
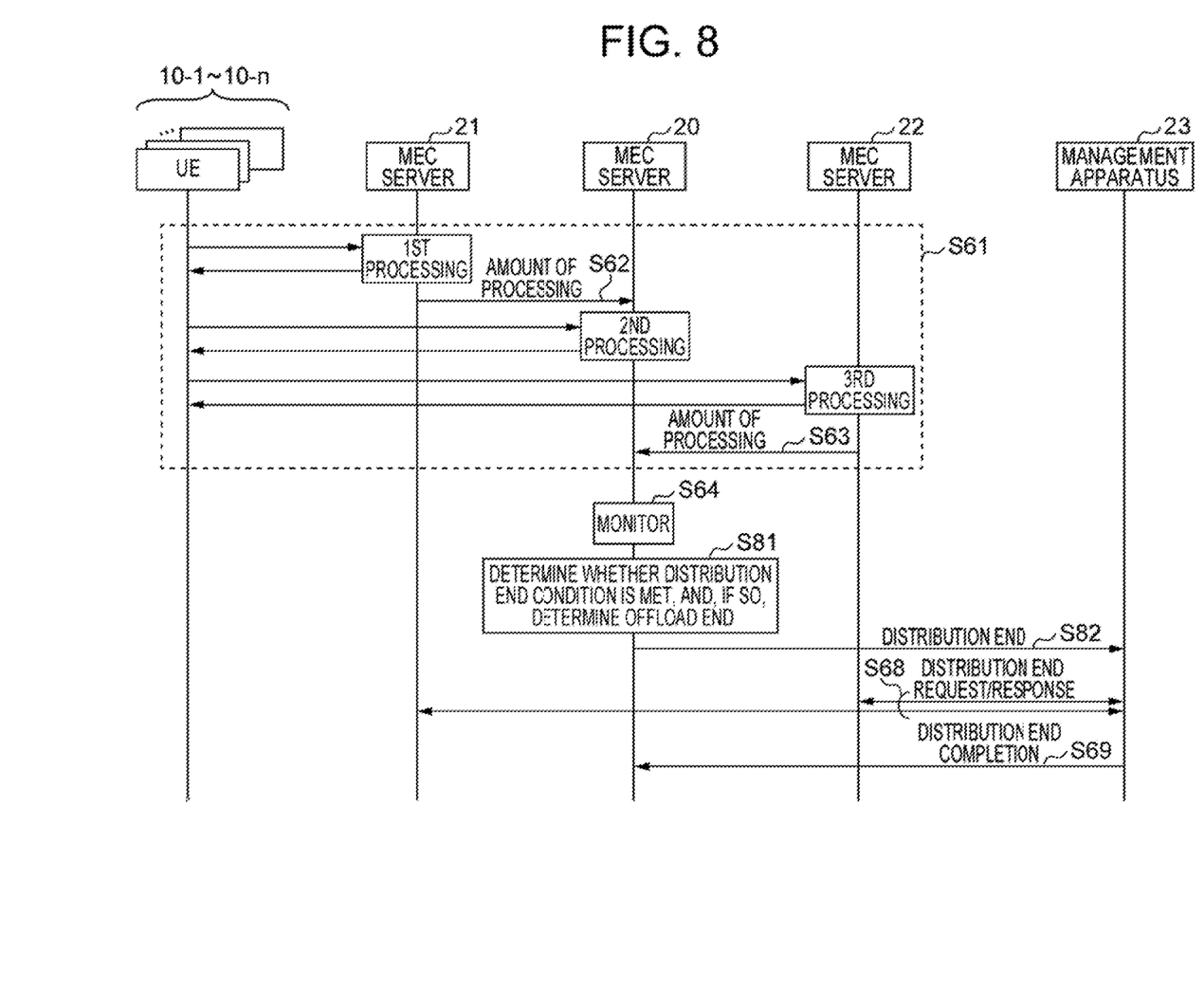
FIG. 8 illustrates a communication sequence diagram after offloading, in a case where a start and end of load distribution is determined by a MEC server.

Referring to FIGS. 7 and 8, a process flow where the start and end of load distribution is determined by the MEC server is described. FIG. 7 illustrates a communication before offloading, and FIG. 8 illustrates a communication sequence after offloading. The same processes as those in FIG. 5 or FIG. 6 are marked with the same reference signs.

In S71, the load manager 404 of the MEC server 20 determines whether a processing load in the processing executioner 403 monitored in S52 meets the distribution start condition. In the example in FIG. 7, it is assumed that the load manager 404 determines that the processing load meets the distribution start condition (S71). For example, when the processing load is an amount of processing being executed by the processing executioner 403, in a case where the amount of processing exceeds the predetermined first threshold value, the load manager 404 determines that the processing load meets the distribution start condition. Alternatively, when the processing load is a resource usage rate for executing the processing by the processing executioner 403, in a case where the resource usage rate exceeds the predetermined second threshold value, the load manager 404 determines that the processing load meets the distribution start condition.

In a case where it is determined that the processing load meets the distribution start conditions, the load manager 404 of the MEC server 20 determines to request offloading control to the management apparatus 23, and the offloading controller 405 transmits an offloading request via the transmitter 401 (S72). The offloading request includes information of the required latency for each processing and an amount of processing to be offloaded. The offloading request may also include information of resources to be reserved execute each processing to meet the requested latency.

After the offloading controller 304 of the management apparatus 23 receives the request, it determines one or more MEC servers (offload destination servers) to which a portion of the processing is to be offloaded and a type of processing to be allocated to meet the required latency (S73). In the example in FIG. 7, the offloading controller 304 determines the MEC servers 21 and MEC server 22 as the offload destination edge servers. The offloading controller 304 of the management apparatus 23 then transmits a resource reservation request to and receive a response from the MEC server 21 and the MEC server 22 (S57). In a case where preparation for offloading is completed, the offloading controller 304 of the management apparatus transmits a packet including information of offload preparation completion to the MEC server 20 (S58). Unlike FIG. 5, the offload preparation completion includes the identification information of the MEC server 21 and the MEC server 22 which are offload destination servers, and information on the type of processing to be allocated (offloaded) to the offload destination servers (in this example, any of the first to the third processing).

After the offloading controller 405 of the MEC server 20 receives the offload preparation complete via the receiver 402, transmits a packet including an execution instruction to the MEC server 20 and MEC server 22 via the transmitter 401 (S74). The execution instructions include identification information of one or more UEs requesting the processing. In a case where the first process is offloaded to the MEC server 20 and the third process is the MEC server 22, the MEC server 20 transmits, to the MEC server 21, the identification information containing the UEs 10-1 to 10-$m$ and 10-$n$ requesting the first processing, and transmits, to the MEC server 22, the identification information containing the UEs 10-1 to 10-$m$ requesting the third processing.

In addition, for example, in a case where only the first processing requested by the UE 10-$n$ that caused an overload at the MEC server 20 is offloaded, the MEC server 20 may transmits, to the offloading edge server that executes the first processing, the execution instruction containing the identification information of the UE 10-$n$. This allows the first to third processing requested by the previously connected UEs 10-1 to 10-$m$ to be executed by the MEC server 20, while the first processing requested by the UE-n, which caused the overload at the MEC server, to be offloaded.

Referring to FIG. 8, the communication sequence after offloading is described. In S81, the load manager 404 of the MEC server 20 monitors a total amount of processing which includes an amount of the first processing and the second processing which is reported by the MEC server 21 and the MEC server 22, and an amount of the second processing that the MEC server 20 itself is executing (S54). The offloading controller 405 of the MEC server 20 determines whether the total amount of processing meets the distribution end condition (S81). For example, the offloading controller 405 of the MEC server 20 determines that the distribution end condition is met in a case where the total amount of processing exceeds a predetermined third threshold value. Upon determining that the distributed end condition is met, the offloading controller 405 of the MEC server 20 transmits a packet indicating an offloading end request (a distribution end request) to the management apparatus 23 via the transmitter 401.

The offloading controller 304 of the management apparatus 23 receives the distribution end request from the MEC server 21 and the MEC server 22 via the receiver 302. The offloading controller 304 then transmits an offloading end request to the MEC server 21 and the MEC server 22 and receives the response (S68).

Thus, according to the present embodiment, the MEC server 20 or the management apparatus 23 executing the processing can perform offloading control properly according to the processing load at MEC server 20 while meeting the processing request time by the UE 10. Furthermore, the UE 10 can continue to request to execute the processing to the MEC server 20 even after offloading, as it did before offloading, and the requested processing (a portion of the processing) may be automatically executed by the MEC server 21 or the MEC server 22. This enables appropriate offloading control without degrading usability.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

Embodiment of the Disclosure

The disclosure includes the following embodiments.

[1] A management apparatus comprising: at least one processor, the at least one processor being configured execute processing, the processing comprising: a determination process for determining whether a processing load in an execution server, among a plurality of edge servers, executing a processing requested by a plurality of communication apparatus meets a distribution start condition; and an offloading control process for, in a case where it is determined that the processing load meets the distribution start condition, controlling to offload a processing being executed by the execution server to one or more offload destination servers, among the plurality of edge servers, that is different from the execution server to meet a processing request time for the requested processing.

[2] The management apparatus according to [1], wherein the determination process includes determining that the processing load meets the distribution start condition in a case where an amount of processing being executed by the execution server exceeds a predetermined threshold value.

[3] The management apparatus according to [1], wherein the determination process includes determining that the processing load meets the distribution start condition in a case where a resource usage rate for executing processing in the execution server exceeds a predetermined threshold value.

[4] The management apparatus according to any one of [1] to [3], wherein the offloading control process includes, to cause the one or more offload destination servers to execute a portion of the processing being executed by the execution server, controlling the one or more offload destination servers to reserve resources and/or controlling the one or more offload destination servers to start or create an application to execute the portion of the processing.

[5] The management apparatus according to any one of [1] to [4], wherein the offloading control process includes controlling a first server, among the one or more offload destination servers, that is located on a route between the plurality of communication apparatus and the execution server to execute first processing of the processing being executed by the execution server.

[6] The management apparatus according to [5], wherein the offloading control process includes, in a case where the plurality of communication apparatuses request the execution server to execute the first processing, controlling a User Plane Function (UPF) connected to the first server so that the first server executes the first processing.

[7] The management apparatus according to any one of [1] to [4], wherein the offloading control process includes controlling a second server, among the one or more offload destination servers, that is located on a route between the execution server and a cloud server connected via Internet to execute second processing of the processing being executed by the execution server.

[8] The management apparatus according to [7], wherein the offloading control process includes, in a case where the plurality of communication apparatuses request the execution server to execute the second processing, controlling a User Plane Function (UPF) connected to the second server so that the second server executes the second processing.

[9] The management apparatus according to any one of [1] to [8], wherein the determination process includes determining whether a total amount of processing executed by the execution server and the one or more offload destination servers after controlling to offload the processing being executed by the execution server meets a distribution end condition, and the offloading control process includes controlling to end offloading in a case where it is determined that the total amount of processing meets the distribution end condition.

[10] An edge server comprising: at least one processor, the at least one processor being configured execute processing, the processing comprising: an execution process for executing processing requested by a plurality of communication apparatus; a determination process for determining whether a processing load in the execution process meets a distribution start condition; and a request process for, in a case where it is determined that the processing load meets the distribution start condition, requesting to a management apparatus to offload a portion of the requested processing to one or more other edge servers to meet a proceeding request time for the requested processing.

[11] The edge server according to [10], wherein the determination process includes determining that the processing load meets the distribution start condition in a case where an amount of processing in the execution process exceeds a predetermined threshold value.

[12] The edge server according to [10], wherein the determination process includes determining that the processing load meets the distribution start condition in a case where a resource usage rate for the execution process exceeds a predetermined threshold value.

[13] An offloading method comprising: determining whether a processing load in an execution server, among a plurality of edge servers, executing a processing requested by a plurality of communication apparatus meets a distribution start condition; and controlling, in a case where it is determined that the processing load meets the distribution start condition, to offload a processing being executed by the execution server to one or more offload destination servers, among the plurality of edge servers, that is different from the execution server to meet a processing request time for the requested processing.

[14] An offloading method comprising: determining whether a processing load for processing requested by a plurality of communication apparatuses; and requesting, in a case where it is determined that the processing load meets the distribution start condition, to a management apparatus to offload a portion of the requested processing to one or more other edge servers to meet a proceeding request time for the requested processing.

[15] A computer-readable storage medium storing a program, the program, when executed by at least one processor in a management apparatus, for causing the management apparatus to execute processing, the processing comprises: a determination process for determining whether a processing load in an execution server, among a plurality of edge servers, executing a processing requested by a plurality of communication apparatus meets a distribution start condition; and an offloading control process for, in a case where it is determined that the processing load meets the distribution start condition, controlling to offload a processing being executed by the execution server to one or more offload destination servers, among the plurality of edge servers, that is different from the execution server to meet a processing request time for the requested processing.

[16] A computer-readable storage medium storing a program, the program, when executed by at least one processor in an edge server, for causing the edge server to execute processing, the processing comprises: a determination process for determining whether a processing load for processing requested by a plurality of communication apparatuses; and a request process for, in a case where it is determined that the processing load meets the distribution start condition, requesting to a management apparatus to offload a portion of the requested processing to one or more other edge servers to meet a proceeding request time for the requested processing.

REFERENCE SIGNS LIST

1: Cell, 2: Core network, 3: Internet, 4: Cloud server, 10-1 to 10-3: UE (Communication apparatus), 301: Transmitter, 302: Receiver, 303: Load manager, 304: Offloading controller, 401: Transmitter, 402: Receiver, 403: Processing executioner, 404: Load manager, 405: Offloading controller

What is claimed is:

1. A management apparatus comprising:
at least one processor; and
memory storing instructions that, when executed by the at least one processor cause the at least one processor to execute:
　a determination process for determining whether a processing load in an execution server, among a plurality of edge servers, executing a processing requested by a plurality of communication apparatuses, meets a distribution start condition; and
　an offloading control process for, in a case where it is determined that the processing load meets the distribution start condition, controlling to offload the processing being executed by the execution server to one or more offload destination servers, among the plurality of edge servers, that is different from the execution server, to meet a processing request time for the requested processing,
wherein, the offloading control process comprises:
　confirming whether any of the one or more offload destination servers is located on a first route of communication between the plurality of communication apparatuses and the execution server; and
　controlling, when it is confirmed that a first server of the one or more offload destination servers is located on the first route, the first server to execute first processing of the processing being executed by the execution server.

2. The management apparatus according to claim 1, wherein
the determination process comprises determining that the processing load meets the distribution start condition in a case where an amount of processing being executed by the execution server exceeds a predetermined threshold value.

3. The management apparatus according to claim 1, wherein
the determination process comprises determining that the processing load meets the distribution start condition in a case where a resource usage rate for executing processing in the execution server exceeds a predetermined threshold value.

4. The management apparatus according to claim 1, wherein
the offloading control process further comprises, to cause the first server to execute the first processing, controlling the first server to reserve resources and/or controlling the first server to start or create an application to execute the first processing.

5. The management apparatus according to claim 1, wherein
the offloading control process further comprises, in a case where the plurality of communication apparatuses are configured to request the execution server to execute the first processing, controlling a User Plane Function (UPF) connected to the first server so that the first server executes the first processing.

6. The management apparatus according to claim 1, wherein the offloading control process further comprises:
confirming whether any of the one or more offload destination servers is located on a second route of communication between the execution server and a cloud server connected via Internet; and
controlling, when it is confirmed that a second server of the one or more offload destination servers is located on the second route, the second server to execute second processing of the processing being executed by the execution server.

7. The management apparatus according to claim 6, wherein
the offloading control process further comprises, in a case where the plurality of communication apparatuses are configured to request the execution server to execute the second processing, controlling a User Plane Function (UPF) connected to the second server so that the second server executes the second processing.

8. The management apparatus according to claim 1, wherein
the determination process comprises determining whether a total amount of processing executed by the execution server and the one or more offload destination servers, after controlling to offload the processing being executed by the execution server, meets a distribution end condition, and
the offloading control process further comprises controlling to end offloading in a case where it is determined that the total amount of processing meets the distribution end condition.

9. The management apparatus according to claim 1, wherein the plurality of communication apparatuses are in one cell.

10. An edge server comprising:
at least one processor; and
memory storing instructions that, when executed by the at least one processor, cause the at least one processor to execute:
an execution process for executing processing requested by a plurality of communication apparatuses;
a determination process for determining whether a processing load in the execution process meets a distribution start condition; and
a request process for, in a case where it is determined that the processing load meets the distribution start condition, requesting to a management apparatus to offload a portion of the requested processing to one or more other edge servers to meet a proceeding request time for the requested processing,
wherein, the request process comprises:
confirming whether any of the one or more other edge servers is located on a first route of communication between the plurality of communication apparatuses and the edge server; and
controlling, when it is confirmed that a first server of the one or more other edge servers is located on the first route, the first server to execute first processing of the requested processing being executed by the edge server.

11. The edge server according to claim 10, wherein
the determination process comprises determining that the processing load meets the distribution start condition in a case where an amount of processing in the execution process exceeds a predetermined threshold value.

12. The edge server according to claim 10, wherein
the determination process comprises determining that the processing load meets the distribution start condition in a case where a resource usage rate for the execution process exceeds a predetermined threshold value.

13. An offloading method comprising:
determining whether a processing load in an execution server, among a plurality of edge servers, executing a processing requested by a plurality of communication apparatuses, meets a distribution start condition;
controlling, in a case where it is determined that the processing load meets the distribution start condition, to offload a processing being executed by the execution server to one or more offload destination servers, among the plurality of edge servers, that is different from the execution server, to meet a processing request time for the requested processing;
confirming whether any of the one or more offload destination servers is located on a first route of communication between the plurality of communication apparatuses and the execution server; and
controlling, when it is confirmed that a first server of the one or more offload destination servers is located on the first route, the first server to execute first processing of the processing being executed by the execution server.

* * * * *